United States Patent
Xu et al.

(10) Patent No.: US 11,695,463 B2
(45) Date of Patent: Jul. 4, 2023

(54) BEAM FAILURE RECOVERY USING CONTENTION BASED RANDOM ACCESS

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Haitong Sun, Irvine, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 17/051,149

(22) PCT Filed: Jun. 28, 2018

(86) PCT No.: PCT/CN2018/093359
§ 371 (c)(1),
(2) Date: Oct. 27, 2020

(87) PCT Pub. No.: WO2020/000308
PCT Pub. Date: Jan. 2, 2020

(65) Prior Publication Data
US 2021/0058132 A1 Feb. 25, 2021

(51) Int. Cl.
*H04B 7/06* (2006.01)
*H04W 76/19* (2018.01)
(Continued)

(52) U.S. Cl.
CPC ......... *H04B 7/0695* (2013.01); *H04B 7/0617* (2013.01); *H04W 74/0833* (2013.01);
(Continued)

(58) Field of Classification Search
CPC .... H04B 7/0695; H04B 7/0617; H04B 7/088; H04W 74/0833; H04W 76/19; H04W 76/27; H04W 80/02; H04W 88/08
See application file for complete search history.

(56) References Cited

U.S. PATENT DOCUMENTS

| 11,206,596 B2 * | 12/2021 | Chen | ..................... H04W 36/36 |
| 2018/0115990 A1 * | 4/2018 | Abedini | ................ H04L 5/0053 |

(Continued)

FOREIGN PATENT DOCUMENTS

| WO | 2017024516 A1 | 2/2017 |
| WO | 2017151876 A1 | 9/2017 |

OTHER PUBLICATIONS

Extended European Search Report for EP Patent Application No. 18924269.6; dated Oct. 20, 2021.
(Continued)

*Primary Examiner* — Will W Lin
(74) *Attorney, Agent, or Firm* — Kowert, Hood, Munyon, Rankin & Goetzel, P.C.

(57) ABSTRACT

This disclosure relates to performing beam failure recovery using a contention based random access procedure in a cellular communication system. A wireless device and a cellular base station may establish a cellular link. Beam configuration information indicating an active beam for downlink communications may be provided. The wireless device may detect beam failure for the active beam. The wireless device may perform a contention based random access procedure based at least in part on detecting beam failure for the active beam. An indication of the detected beam failure may be provided to the cellular base station by the wireless device as part of the contention based random access procedure.

20 Claims, 6 Drawing Sheets

(51) Int. Cl.
    *H04W 76/27* (2018.01)
    *H04W 74/08* (2009.01)
    *H04W 80/02* (2009.01)
    *H04W 88/08* (2009.01)

(52) U.S. Cl.
    CPC ........... *H04W 76/19* (2018.02); *H04W 76/27* (2018.02); *H04W 80/02* (2013.01); *H04W 88/08* (2013.01)

(56) References Cited

U.S. PATENT DOCUMENTS

| | | | | |
|---|---|---|---|---|
| 2019/0132778 A1* | 5/2019 | Park | ...................... | H04W 76/18 |
| 2019/0253986 A1* | 8/2019 | Jeon | ...................... | H04B 7/0695 |
| 2019/0313264 A1* | 10/2019 | Lin | ...................... | H04W 76/11 |
| 2019/0356376 A1* | 11/2019 | You | ...................... | H04B 7/0695 |
| 2020/0373992 A1* | 11/2020 | Wang | ...................... | H04W 56/001 |
| 2021/0058136 A1* | 2/2021 | Yang | ...................... | H04B 7/0695 |
| 2021/0058999 A1* | 2/2021 | Chen | ...................... | H04W 76/19 |
| 2021/0067234 A1* | 3/2021 | Guan | ...................... | H04W 72/046 |

OTHER PUBLICATIONS

CATT "Beam Management"; 3GPP TSG-RAN WG2 Meeting #NR AH2 R2-1706396; Qingdao, China; Jun. 27-29, 2017.
Nokia et al. "Remaining Details on Beam Recovery"; 3GPP TSG-RAN WG1 Meeting #93 R1-1807185; Busan, Korea; May 21-25, 2018.
International Search Report and Written Opinion for Application No. PCT/CN2018/093359; 9 pages.
Sharp R2-1803045, Identification of Contention based random access for beam failure recover 3GPP TSG-RAN WG2 #101; Mar. 2, 2018.
Ericsson R2-1803198, Contention based random access for beam failure recover 3GPP TSG-RAN WG2 #101; Mar. 2, 2018.
Samsung R2-1806824, Contention based BFR Procedure: Reporting Candidate Beam 3GPP TSG-Ran2 102; May 25, 2018.
Catt R1-1700225, Discussion on beam rec over #GPP TSG RAN WG1 AH_NR Meeting; Jan. 20, 2017.
Nokia et al. R1-1710892, NR4-Step RACH procedure 3GPP TSG RAN WG1 NR Ad-Hoc#2; Jun. 30, 2017.
Ericsson R2-1803195, Beam Failure Recover in SCell 3GPP TSG-RAN Wg2 #101; Mar. 2, 2018.
ZTE Corporation et al. R1-1611274, On 2-Step RACH procedure in NR 3GPP TSG RAN WG1 Meeting #87; Nov. 18, 2016.

* cited by examiner

BEAM FAILURE RECOVERY USING CONTENTION BASED RANDOM ACCESS

PRIORITY CLAIM INFORMATION

This application is a national stage application of International Application No. PCT/CN2018/093359, filed on Jun. 28, 2018, titled "Beam Failure Recovery Using Contention Based Random Access", which is hereby incorporated by reference in its entirety.

FIELD

The present application relates to wireless communications, and more particularly to systems, apparatuses, and methods for performing beam failure recovery using a contention based random access procedure in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. Accordingly, improvements in the field are desired.

For example, some cellular communication systems include the use of beamforming techniques. In such circumstances a beam configuration may be used to effectively increase the signal strength of a transmitted signal in a targeted direction or area. However, if a beam is not targeted properly, it may be possible for a device attempting to receive the beam to be unable to do so. Accordingly, to handle such a scenario and other possible beam failure scenarios, improvements in beam failure recovery techniques are desired.

SUMMARY

Embodiments are presented herein of apparatuses, systems, and methods for performing beam failure recovery using a contention based random access procedure in a cellular communication system.

According to the techniques described herein, it may be possible to use an explicit and/or an implicit mechanism to indicate a beam failure recovery request when performing a contention based random access procedure.

In the explicit mechanism, a wireless device may be able to include message content indicating a beam failure recovery request, and potentially other information that may be useful for reconfiguring an active beam for the wireless device, as part of the contention based random access procedure. For example, such information could be provided using media access control or radio resource control signaling as part of a message 3 of the contention based random access procedure.

In the implicit mechanism, configuration information indicating a set of physical random access channel resources and preambles configured to indicate a beam failure recovery request when used to initiate a contention based random access procedure may be provided to a wireless device by the base station providing the serving cell for the wireless device. Thus, when the wireless device detects beam failure of its active beam, it may be possible for the wireless device to initiate a contention based random access procedure using a preamble and physical random access channel resource combination configured to indicate a beam failure recovery request.

In either such mechanism, the base station may be able to determine that the wireless device is indicating a beam failure recovery request as part of the contention based random access procedure. The base station may accordingly be able to provide beam reconfiguration information to the wireless in a timely manner. This may in turn help avoid data transmission failure and/or radio link failure, and/or may improve the throughput and/or power efficiency of communications between the base station and the wireless device.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
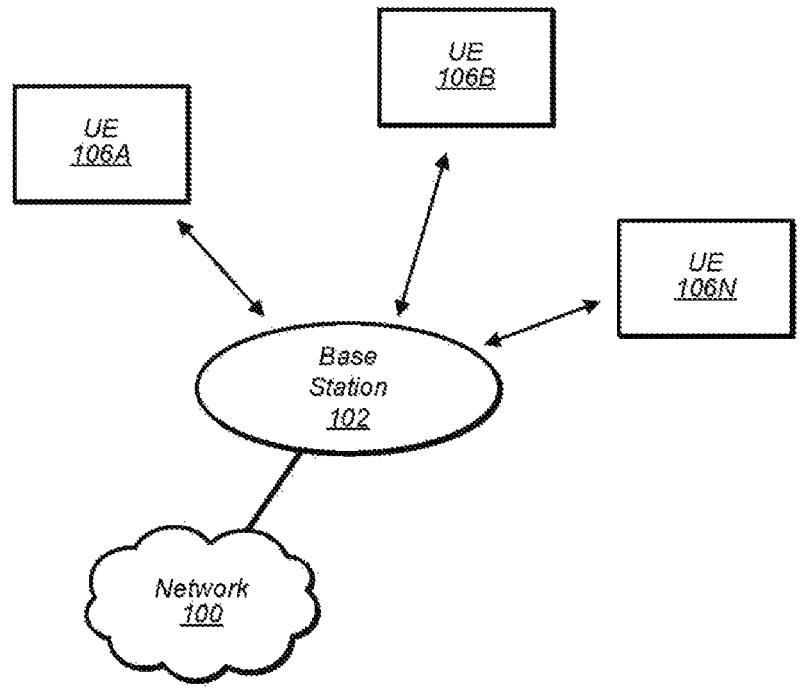
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
 UE: User Equipment
 RF: Radio Frequency
 BS: Base Station
 GSM: Global System for Mobile Communication
 UMTS: Universal Mobile Telecommunication System
 LTE: Long Term Evolution
 NR: New Radio
 TX: Transmission/Transmit
 RX: Reception/Receive
 RAT: Radio Access Technology
 CFRA: Contention Free Random Access
 CBRA: Contention Based Random Access Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
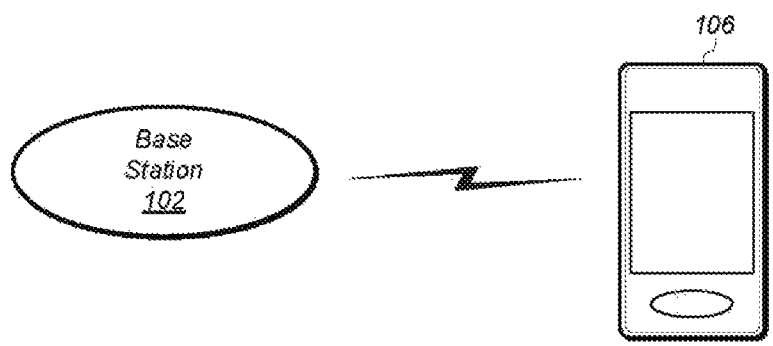
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform beam failure recovery using a contention based random access procedure such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1xRTT (or LTE or NR, or LTE or GSM), and separate radios for communicating using each of Wi-Fi and BLUETOOTH™. Other configurations are also possible.

Figure 3:
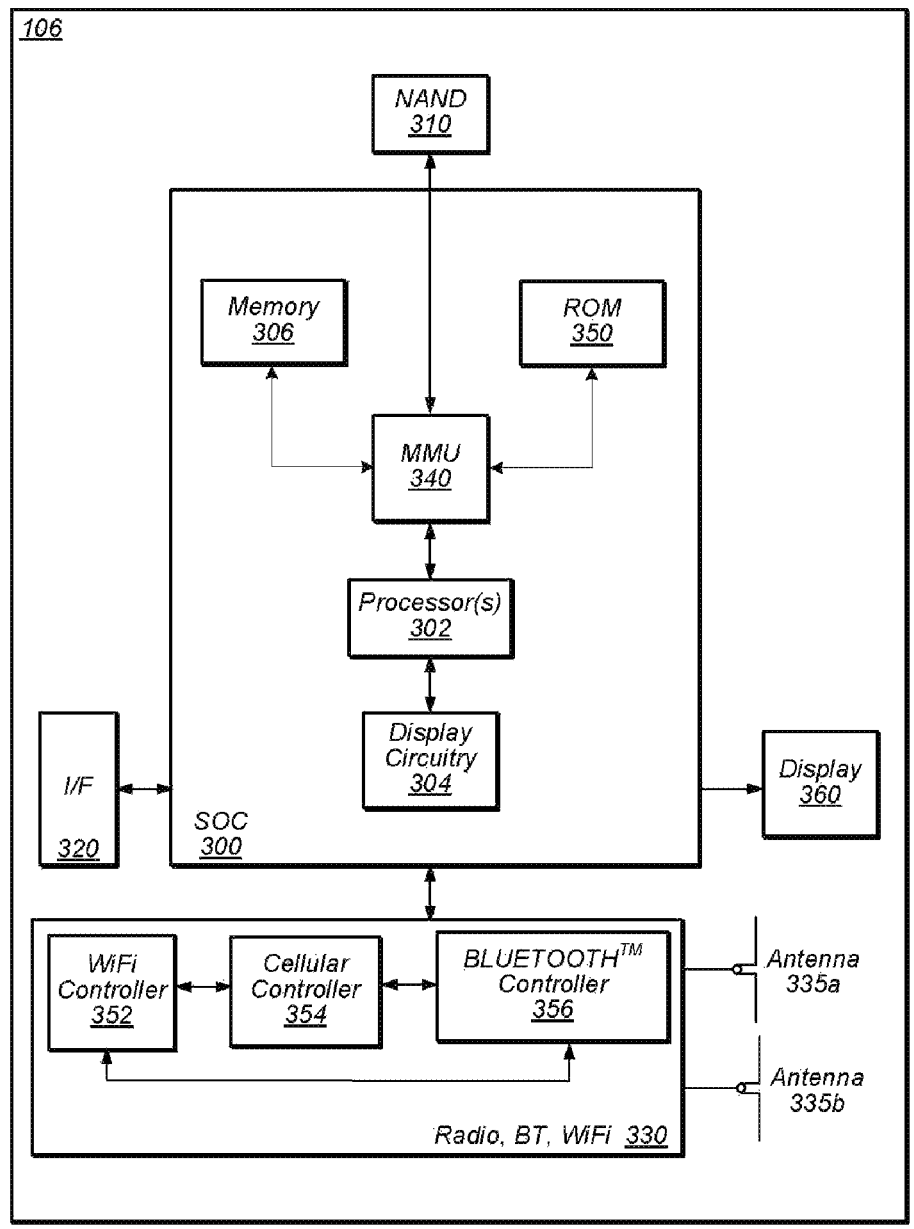
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery using a contention based random access procedure such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
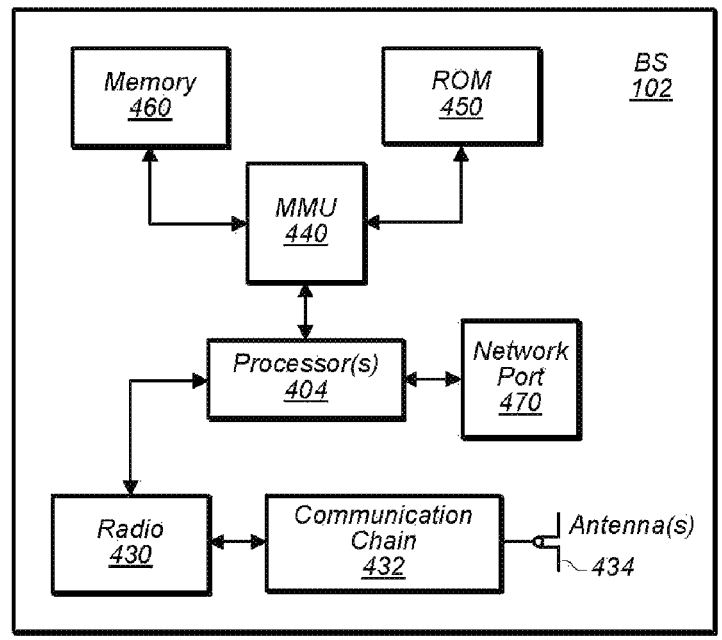
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for performing beam failure recovery using a contention based random access procedure in a cellular communication system.

Figure 5:
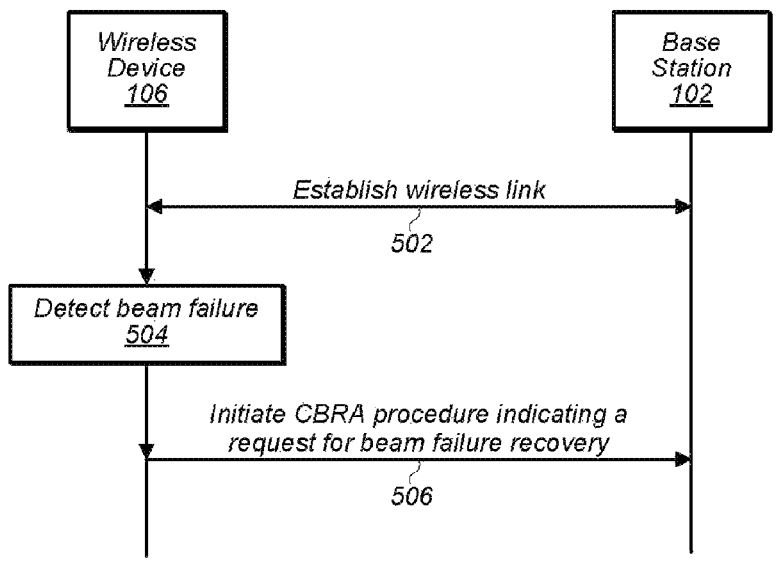
FIG. 5 is a communication flow diagram illustrating aspects of an exemplary possible method for performing beam failure recovery using a contention based random access procedure in a cellular communication system, according to some embodiments.

FIG. 5—Beam Failure Recovery Using a Contention Based Random Access Procedure

Some wireless communication techniques may utilize beamforming for at least some communications. Such techniques may reduce the power requirements and/or increase the effective communication range for wireless communications in a specific direction or area. However, due to mobility, changing medium conditions, and/or for any of a variety of other reasons, it can sometimes occur that a beam configuration in use fails, which can lead to service interruption or loss. Accordingly, techniques for recovering from such beam failure (e.g., to select a new beam configuration) may be important.

FIG. 5 is a communication flow diagram illustrating a method for wireless devices (e.g., a cellular base station and a wireless user equipment (UE) device, as shown, as one possibility) to perform beam failure recovery using a contention based random access procedure in a cellular communication system, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device and the cellular base station may establish a wireless link.

According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state.

As part of establishing the RRC connection and/or in one or more other ways (e.g., via broadcast system information, via media access control (MAC) control elements, etc.), the base station may provide beam configuration information to the wireless device. The beam configuration information may include any of various information for supporting beam use between the cellular base station and the wireless device. As one possibility, the beam configuration information may indicate one or more active beams (e.g., an active beam set) for downlink communications from the cellular base station. The beam configuration information may also indicate one or more other configured (but not active) beams, e.g., that the wireless device may be able to (and may be expected to, at least in some instances) monitor (e.g., using reference symbols associated with those configured beams that are provided by the cellular base station).

As another possibility, the beam configuration information may indicate one or more resource pools that may be used in conjunction with beam failure recovery techniques.

For example, the cellular base station may determine a pool of physical random access channel (PRACH) resources and/or dedicated PRACH preambles dedicated for use by the wireless device to indicate that beam failure has occurred may be indicated. Since such resources/preambles are provided specifically to the wireless device, it may thus be possible for the wireless device to make use of them to perform a contention free random access (CFRA) procedure to indicate beam failure and request beam failure recovery. In some instances, the pool may include at least one set of resources/preambles for each configured beam, e.g., such that the resources and preamble used may implicitly indicate a preferred beam to use as the active beam when performing beam failure recovery. As another example, the cellular base station may determine a pool of PRACH resources and/or dedicated PRACH preambles that are commonly available (e.g., to the wireless device and one or more other wireless devices) to indicate that beam failure has occurred may be indicated. Since such resources/preambles are not provided exclusively to the wireless device but may be shared among at least a subset of wireless devices served by the cellular base station, it may thus be possible for the wireless device to make use of them to perform a contention based random access (CBRA) procedure to indicate beam failure and request beam failure recovery. The pool may include resources/preambles associated with specific configured beams (e.g., such that use of a PRACH preamble and resource combination associated with a specific beam to initiate a contention based random access procedure may indicate a request to activate the specific beam), and/or may include resources/preambles configured to indicate generally that beam failure has occurred and that are not associated with specific configured beams.

Note that the cellular base station may further provide an indication of one or more pools of PRACH preambles and resources that are available for one or more other contention based random access procedure triggers according to the cellular link with the cellular base station. For example, resource/preamble pools for uplink data arrival, uplink synchronization, and/or other purposes may also be provided. Such resource/preamble pools may be different than and separate from the beam failure recovery specific pool of PRACH preambles and resources, at least according to some embodiments, e.g., to facilitate differentiation by the cellular base station of contention based random access procedures that are performed by wireless devices for different reasons.

In 504, the wireless device may detect beam failure for an active beam. Detecting beam failure may be based at least in part on the wireless device monitoring a beam failure detection reference symbol (e.g., a reference symbol associated with the active beam), e.g., in the course of its communications with the cellular base station. For example, the wireless device may (e.g., periodically) perform measurements to determine the reference signal received power (RSRP) and/or the value of one or more other signal strength and/or signal quality metrics for the active beam using the beam failure detection reference symbol. If the RSRP (and/or other metric value(s)) are worse than a configured threshold (e.g., which may be network configured as part of the beam configuration information, determined by the wireless device, specified by standard specification documents, or otherwise determined in any of various possible ways), the wireless device may determine that beam failure has occurred for the active beam. Note that variations of such a technique and/or any of various other techniques for determining when beam failure has occurred are possible.

In some instances, the wireless device may determine a preferred beam, e.g., among configured beams indicated in the beam configuration information, in conjunction with detecting beam failure of the active beam. For example, as previously noted, the wireless device may monitor reference symbols associated with the configured beams, and may be able to determine the RSRP and/or other signal strength/quality metric values for each candidate beam. Thus, if a beam meets one or more predetermined requirements (e.g., RSRP above a certain threshold, and/or greater than the RSRP of the active beam by a certain margin, among various possibilities), such a beam may be considered a preferred beam, as one possibility. Other techniques (or variations on such a technique) may also or alternatively be used in determining one or more preferred beams.

In 506, the wireless device may initiate a contention based random access procedure, e.g., based at least in part on detecting beam failure for the active beam. At least according to some embodiments, the contention based random access procedure may be initiated by the wireless device providing a PRACH preamble (a "message 1"), and may further include the cellular base station providing a random access response (a "message 2") in response to the PRACH preamble, the wireless device following up with a transmission (a "message 3") scheduled by the random access response (which may include device identification information, such as a cell radio network temporary identifier (C-RNTI)), and the cellular base station responding with a contention resolution message (a "message 4") to complete the contention based random access procedure. Note that in some instances, an abbreviated contention based random access procedure may also or alternatively be possible. For example, it may be possible to include C-RNTI information with the PRACH preamble, and for the cellular base station to respond directly to the PRACH preamble with the contention resolution message, in some instances.

The wireless device may indicate that it has detected beam failure for the active beam, and/or may request beam failure recovery, as part of the contention based random access procedure. For example, as previously noted, in some instances, the wireless device may be able to use PRACH resources and/or a PRACH preamble configured to indicate that beam failure has occurred and to request beam failure recovery to initiate the CBRA procedure, such as PRACH resources and a PRACH preamble selected from a beam failure recovery specific pool of PRACH preambles and resources. Thus, the cellular base station may receive the PRACH preamble and may be able to determine based on the PRACH preamble and/or the resources on which the PRACH preamble is received that the wireless device is experiencing beam failure of the active beam. In such a case, the cellular base station may provide RRC beam set reconfiguration information, a MAC control element adjusting an activated beam set, and/or other beam configuration information indicating a new active beam for downlink communications from the cellular base station along with contention resolution (e.g., as the message 4 in a normal contention based random access procedure or possibly as the message 2 in an abbreviated contention based random access procedure if C-RNTI information is also provided with the PRACH preamble configured to indicate that beam failure has occurred).

As another (e.g., additional or alternative) possibility, the wireless device may provide an explicit indication that beam failure has occurred for the active beam and/or to request beam failure recovery as part of the contention based random access procedure. For example, as part of the scheduled transmission (message 3), message content indicating any or all of a request to perform beam failure recovery, an indication of one or more preferred beams (e.g., if determined), a beam measurement result for the active beam, carrier identification information for a carrier associated with the active beam that has failed (e.g., if multiple carriers are configured and active), and/or bandwidth part identification information for a bandwidth part associated with the active beam that has failed (e.g., if multiple bandwidth parts are configured and active), among various possible indications, may be provided by the wireless device. Such information may be provided using a MAC control element and/or a RRC information element, according to various embodiments. In such a case, the cellular base station may provide RRC beam set reconfiguration information, a MAC control element adjusting an activated beam set, and/or other beam configuration information indicating a new active beam for downlink communications from the cellular base station along with contention resolution, e.g., as the message 4 provided in response to the message 3.

Thus, it may be possible for a wireless device to indicate that beam failure has occurred and to request beam failure recovery using a contention based random access procedure. Such techniques may help the network to quickly distinguish beam failure request based contention based random access procedures from contention based random access procedures performed for other reasons (e.g., uplink data arrival, uplink synchronization, etc.), and thus to more quickly perform serving beam reconfiguration for a wireless device experiencing active beam failure than if no means to indicate that beam failure has occurred using a contention based random access procedure is provided, at least according to some embodiments.

Further, such techniques may improve the PRACH resource and preamble use efficiency for beam failure recovery, e.g., in comparison to techniques in which contention free random access procedures are used for reporting beam failure requests, at least according to some embodiments. For example, for CFRA procedure based beam failure request reporting, dedicated PRACH/preamble resources for beam failure requests may be provided to each wireless device, while for CBRA procedure based beam failure request reporting, PRACH/preamble resources for beam failure requests may be shared among multiple wireless devices, thus potentially improving PRACH resource use efficiency.

FIGS. 6-10—Additional Information

FIGS. 6-10 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
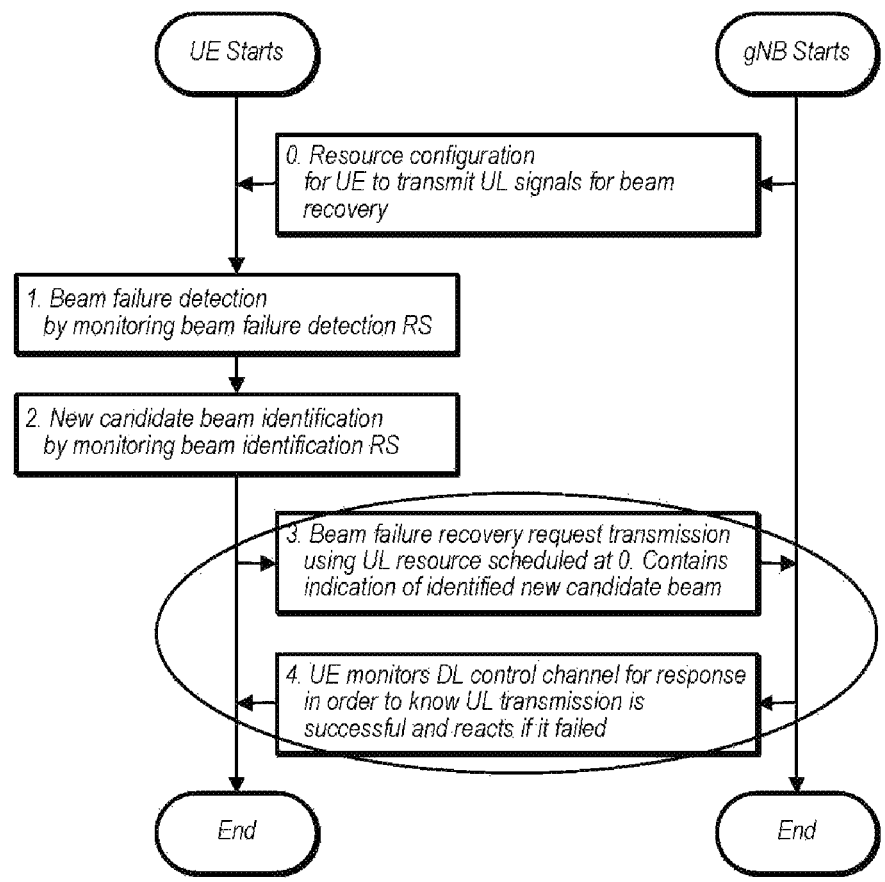
FIG. 6 is a communication flow diagram illustrating aspects of an exemplary possible method for performing beam failure recovery using a contention free random access procedure in a cellular communication system, according to some embodiments.

Beam failure recovery may be performed by a wireless device that detects beam failure, e.g., of an active beam configured for the wireless device. Beam failure recovery may be performed via a random access channel (RACH) procedure, such as a CFRA procedure or a CBRA procedure. FIG. 6 is a communication flow diagram illustrating a CFRA procedure based technique for performing beam failure recovery between a gNB and a UE.

As shown, the gNB may provide RRC configuration information to the UE, including resource configuration information indicating resources that can be used to transmit uplink signals for beam recovery. These may include UE specific dedicated PRACH/preamble resources, and associations between PRACH/preamble resources and candidate beams. Upon beam failure detection (e.g., by monitoring beam failure detection reference symbols), the wireless device may perform new candidate beam identification, e.g., by monitoring beam identification reference symbols (e.g., synchronization signal block (SSB) or channel state information reference symbols (CSI-RS)) and determining a candidate beam that has signal strength above a threshold. Note that when multiple beams are valid, the UE may determine how to select a preferred beam among the multiple valid beams, at least according to some embodiments. The UE may then perform a beam failure recovery request transmission, e.g., using the uplink resources configured by the gNB. The beam failure recovery request transmission may indicate the new candidate beam identified by the UE, e.g., by use of PRACH/preamble resources associated with that candidate beam. In response to the beam failure recovery request transmission, the gNB may respond (e.g., potentially including providing beam reconfiguration information indicating a new active beam) on the PDCCH scrambled with the C-RNTI of the UE within a certain time duration.

Thus, the gNB may be able to distinguish such a request from other RACH procedures via the RACH resource and preamble used for the CFRA procedure, and upon receiving the beam failure recovery request, the gNB may be able to understand the UE's preferred beam from the configured set of candidate beams (e.g., those that are different from the current serving beam used for monitoring the serving PDCCH), and may be able to reconfigure the serving beam accordingly.

However, in some instances, such a CFRA procedure based technique for performing beam failure recovery between a gNB and a UE may be unsuccessful, may not be possible, or may otherwise not be used. In such instances, a CBRA procedure based technique for performing beam failure recovery between a gNB and a UE may be used. For example, if no or incomplete UE specific beam failure recovery configuration information (e.g., no BeamFailureRecoveryConfig, or recoveryControlResourceSetId, or recovery SearchSpaceId configuration) is provided, or if no valid beam is detected (e.g., no candidate beam has RSRP above a RSRP threshold), or if a CFRA procedure performed upon beam recovery timer expiry is unsuccessful, the wireless device may attempt to use a CBRA procedure to perform beam failure recovery.

Figure 7:
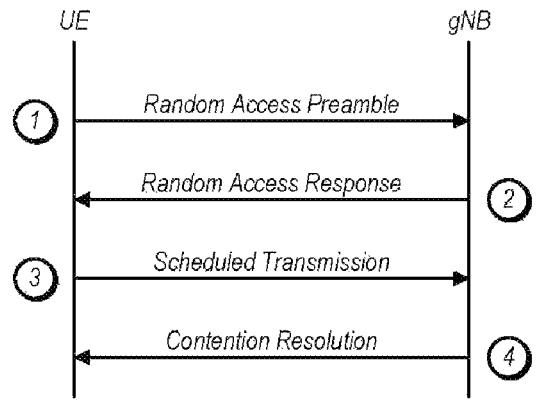
FIG. 7 is a communication flow diagram illustrating aspects of an exemplary possible contention based random access procedure, according to some embodiments.

FIG. 7 is a communication flow diagram illustrating a CBRA procedure such as might be used for performing beam failure recovery between a gNB and a UE if the set of PRACH/preamble resources for CBRA procedures is common for all events, e.g., including beam failure requests, uplink data arrival, and uplink synchronization. In such a case, the gNB may not be able to distinguish beam failure recovery events from other events that might cause a UE to perform a CBRA procedure. As a result, the gNB may not be able to recognize the inappropriate serving beam configuration immediately, and data transmission failure, further beam link failure, and/or potentially radio link failure may occur.

Figure 8:
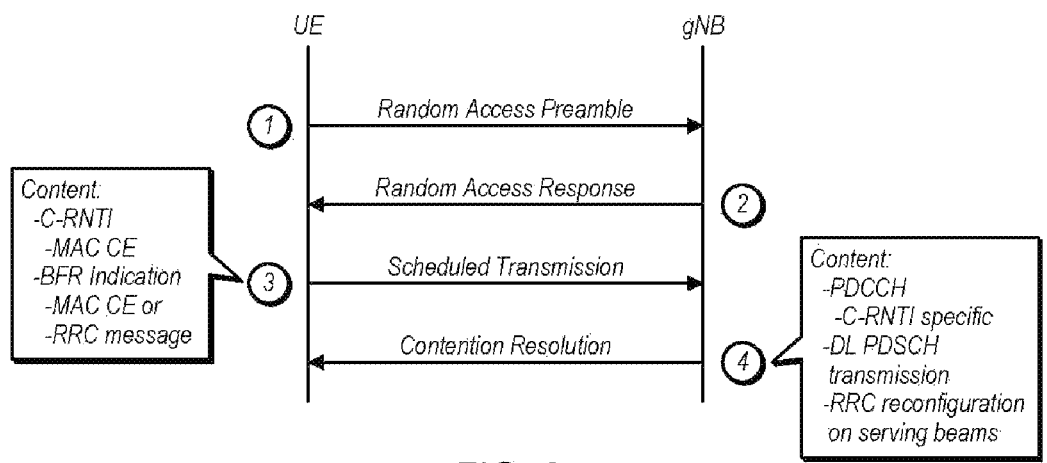
FIGS. 8-10 illustrate further aspects of possible techniques for performing beam failure recovery using a contention based random access procedure in a cellular communication system, according to some embodiments.
Figure 9:
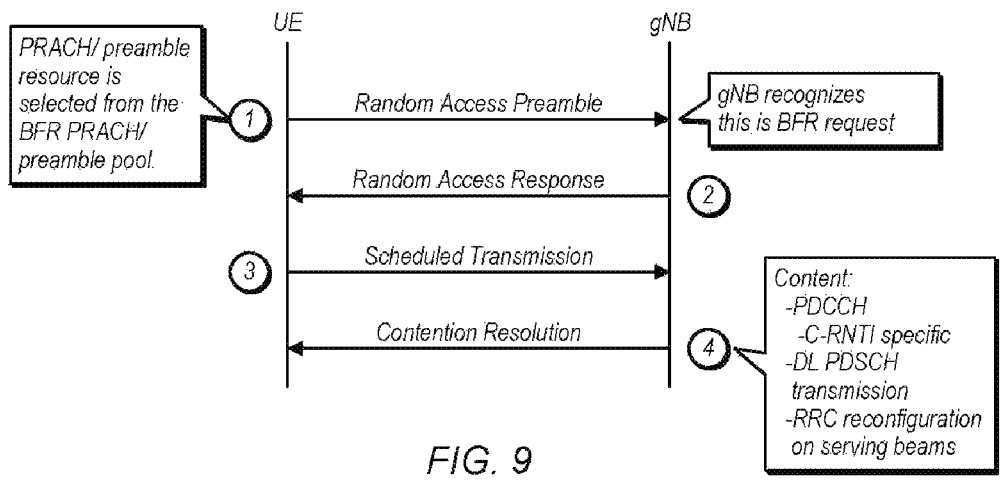
Figure 10:
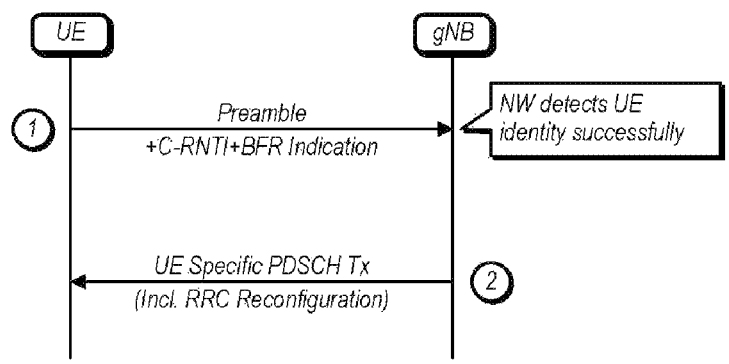

Accordingly, it may be advantageous, at least according to some embodiments, to provide a mechanism for a UE to indicate that beam failure has occurred and to request beam failure recovery as part of a CBRA procedure. Such a mechanism may allow the gNB to perform reconfiguration of the serving beam for a UE in a more timely manner, upon successful completion of a CBRA procedure for beam failure recovery. FIGS. 8-10 illustrate several such possible mechanisms.

FIG. 8 is a communication flow diagram illustrating a CBRA procedure such as might be used for performing beam failure recovery between a gNB and a UE, in which an explicit beam failure recovery request is indicated, e.g., in the message 3 of the CBRA procedure. The explicit indication could be provided using a new MAC CE or RRC message. The content may include any or all of the beam failure recovery request, an indication of the preferred beam set from the UE side, the beam measurement result, and/or the carrier ID or the bandwidth part (BWP) ID for which beam failure recovery is requested, among various possible types of information. Upon successful message 3 reception, the gNB may thus be able to perform the serving beam reconfiguration in the following downlink transmission (e.g. the message 4).

FIGS. 9-10 are communication flow diagrams illustrating CBRA procedures such as might be used for performing beam failure recovery between a gNB and a UE, in which an implicit beam failure recovery request is indicated, e.g., by using PRACH/preamble resources configured to indicate a beam failure recovery request to initiate the CBRA. In such approaches, configuration information may be provided to the UE by the gNB indicating separate PRACH/preamble resource pools for beam failure recovery and other purposes. The beam failure recovery specific PRACH/preamble resources may be shared among multiple UEs. The configuration information may be provided by RRC broadcast or dedicated RRC configuration, according to various embodiments. For broadcast configuration information, the PRACH/preamble resources and the linkage to SSB may be cell specific, and may be common for all UEs. For dedicated configuration information, the PRACH/preamble resources can be the same or different from the SIB PRACH configuration. If different, the PRACH configuration can be linked to SSB or CSI-RS.

In the mechanism illustrated in FIG. 9, the gNB may be able to recognize that the CBRA procedure indicates a beam failure recovery request from the message 1, but may still need the UE identification information, which may be provided in the message 3, to resolve the contention.

In the mechanism illustrated in FIG. 10, in addition to using PRACH/preamble resources configured to indicate a beam failure recovery request to initiate the CBRA, the UE may include its ID (e.g., C-RNTI) in the message 1 together with the preamble. Thus, the gNB may be able to recognize that the CBRA procedure indicates a beam failure recovery request and may be able to determine the UE ID from the message 1. Accordingly, after receiving the message 1, the gNB may directly resolve the contention and confirm the beam failure recovery request (e.g., including beam reconfiguration information) using downlink control information scrambled by the C-RNTI of the UE. Note that if such a mechanism is used, if the gNB detects only the RACH preamble but not the C-RNTI, the gNB may still be able to transmit a random access response message 2, to be followed by message 3 and message 4 exchanges to resolve contention in a manner similar to the mechanism of FIG. 9, e.g., as a fallback case.

Thus, such mechanisms may help the network distinguish beam failure recovery requests from other RACH events during CBRA procedures, and accordingly to increase the likelihood of performing serving beam reconfiguration in time to reduce data transmission failures and avoid radio link failure. Additionally, such techniques may allow for more efficient PRACH and preamble resource usage for beam failure recovery requests, e.g., as providing shared PRACH/preamble resource pools among UEs for beam failure recovery requests may represent a more efficient use of resources than providing dedicated UE specific PRACH/preamble resources for beam failure recovery requests, at least according to some embodiments.

Note further that, if desired, such techniques may also or alternatively be used to facilitate transitions between configured beams even when beam failure has not technically occurred, e.g., to improve the throughput and/or power efficiency of communications between the base station and the wireless device. For example, such techniques (or a variation on such techniques) could be used by a wireless device and a base station to transition from an active beam of marginal signal quality (e.g., but that is not so poor as to be determined to have failed) to a beam with substantially better signal strength/quality.

In the following further exemplary embodiments are provided.

One set of embodiments may include an apparatus, comprising a processing element configured to cause a wireless device to: establish a cellular link with a cellular base station, receive beam configuration information for the cellular link, wherein the beam configuration information indicates one or more active beams for downlink communications from the cellular base station; detect beam failure for an active beam; and perform a contention based random access procedure based at least in part on detecting beam failure for the active beam, wherein an indication of the detected beam failure is provided to the cellular base station by the wireless device as part of the contention based random access procedure.

According to some embodiments, the processing element is further configured to cause the wireless device to: receive beam reconfiguration information for the cellular link from the cellular base station based at least in part on the indication of the detected beam failure, wherein the beam reconfiguration information indicates a new active beam for downlink communications from the cellular base station, wherein the beam reconfiguration information is provided via one of radio resource control (RRC) beam set reconfiguration information or a media access control (MAC) control element adjusting an activated beam subset.

According to some embodiments, the processing element is further configured to cause the wireless device to: receive an indication of a beam failure recovery specific pool of PRACH preambles and resources, wherein the indication of the beam failure recovery specific pool of PRACH preambles and resources is received via one of wireless device specific radio resource control configuration information or broadcast configuration information; and receive an indication of one or more pools of PRACH preambles and resources that are available for one or more other contention based random access procedure triggers according to the cellular link with the cellular base station, wherein the beam failure recovery specific pool of PRACH preambles and resources and the one or more pools of PRACH preambles and resources that are available for one or more other contention based random access procedure triggers comprise different PRACH preambles and resources.

According to some embodiments, the indication of the detected beam failure is provided by initiating the contention based random access procedure using physical random access channel (PRACH) resources and a PRACH preamble configured to indicate a detected beam failure, wherein the PRACH resources and the PRACH preamble used to initiate the contention based random access procedure are selected from the beam failure recovery specific pool of PRACH preambles and resources.

According to some embodiments, the beam failure recovery specific pool of PRACH preambles and resources comprises one or more PRACH preamble and resource combinations associated with specific beams, wherein use of a PRACH preamble and resource combination associated with a specific beam to initiate a contention based random access procedure indicates a request to activate the specific beam.

According to some embodiments, the indication of the detected beam failure is provided by including message content configured to indicate a detected beam failure, wherein the message content configured to indicate a detected beam failure is comprised in a message 3 of the contention based random access procedure.

According to some embodiments, the message content configured to indicate a detected beam failure comprises an indication of one or more of: a request to perform beam failure recovery; an indication of one or more preferred beams; a beam measurement result for the active beam; carrier identification information for a carrier associated with the detected beam failure; or bandwidth part (BWP) identification information for a BWP associated with the detected beam failure.

According to some embodiments, beam failure for the active beam is detected based at least in part on measurement of a beam failure detection reference symbol provided by the cellular base station.

Another set of embodiments may include a wireless device, comprising: an antenna; a radio operably coupled to the antenna; and a processing element operably coupled to the radio; wherein the wireless device is configured to: establish a cellular link with a cellular base station, receive beam configuration information for the cellular link, wherein the beam configuration information indicates an active beam for downlink communications from the cellular base station; detect beam failure for the active beam; and perform a contention based random access procedure based at least in part on detecting beam failure for the active beam, wherein the wireless device provides a request for beam failure recovery during the contention based random access procedure.

According to some embodiments, the wireless device is further configured to: receive beam reconfiguration information for the cellular link from the cellular base station based at least in part on the indication of the detected beam failure, wherein the beam reconfiguration information indicates a new active beam for downlink communications from the cellular base station.

According to some embodiments, the beam configuration information further indicates a set of physical random access channel (PRACH) resources and PRACH preambles configured to indicate a detected beam failure, wherein the indication of the detected beam failure is provided by initiating the contention based random access procedure using one or more of PRACH resources or a PRACH preamble selected from the set of PRACH resources and PRACH preambles configured to indicate a detected beam failure.

According to some embodiments, the wireless device is further configured to: provide wireless device identification information to the cellular base station in a message 1 of the contention based random access procedure; and receive contention resolution and beam reconfiguration information in a message 2 of the contention based random access procedure based at least in part on the wireless device identification information being included in the message 1 of the contention based random access procedure.

According to some embodiments, the indication of the detected beam failure is provided using media access control or radio resource control signaling in a message 3 of the contention based random access procedure.

According to some embodiments, the beam configuration information further indicates a configured set of candidate beams, wherein the wireless device is further configured to: determine a preferred beam among the configured set of candidate beams, wherein an indication of the preferred beam is provided to the cellular base station by the wireless device as part of the contention based random access procedure.

A further set of embodiments may include a cellular base station, comprising: an antenna; a radio operably coupled to the antenna; and a processing element operably coupled to the radio; wherein the cellular base station is configured to: establish a cellular link with a wireless device, provide beam configuration information for the cellular link to the wireless device, wherein the beam configuration information indicates an active beam for downlink communications to the wireless device; receive a request for beam failure recovery from the wireless device during a contention based random access procedure initiated by the wireless device; and provide beam reconfiguration information for the cellular link to the wireless device based at least in part on the request for beam failure recovery, wherein the beam reconfiguration information indicates a new active beam for downlink communications to the wireless device.

According to some embodiments, the cellular base station is further configured to: determine a set of physical random access channel (PRACH) resources and PRACH preambles configured to indicate beam failure when used to initiate a contention based random access procedure, wherein the beam configuration information further indicates the set of PRACH resources and PRACH preambles configured to indicate beam failure when used to initiate a contention based random access procedure; wherein the request for beam failure recovery comprises initiation of the contention based random access procedure by the wireless device using PRACH resources and a PRACH preamble selected from the set of PRACH resources and PRACH preambles configured to indicate beam failure when used to initiate a contention based random access procedure.

According to some embodiments, the cellular base station is further configured to: provide beam configuration information indicating the set of PRACH resources and PRACH preambles configured to indicate beam failure when used to initiate a contention based random access procedure to one or more other wireless devices, wherein the set of PRACH resources and PRACH preambles configured to indicate beam failure when used to initiate a contention based random access procedure are shared among the wireless device and the one or more other wireless devices.

According to some embodiments, the cellular base station is further configured to: receive wireless device identification information with the PRACH preamble used by the wireless device to initiate the contention based random access procedure; and provide contention resolution and the beam reconfiguration information in response to the PRACH preamble based at least in part on the wireless device identification information being included with the PRACH preamble used by the wireless device to initiate the contention based random access procedure.

According to some embodiments, the cellular base station is further configured to: provide a random access response to the wireless device in response to the PRACH preamble used by the wireless device to initiate the contention based random access procedure; receive wireless device identification information in a transmission of the contention based random access procedure scheduled by the random access response; and provide contention resolution and the beam reconfiguration information in response to the transmission of the contention based random access procedure scheduled by the random access response.

According to some embodiments, wherein the request for beam failure recovery comprises media access control or radio resource control signaling received by the cellular base station in a message 3 of the contention based random access procedure.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a wireless device to:
detect beam failure; and
perform a contention based random access procedure based at least in part on detecting beam failure, wherein an indication of the detected beam failure is provided to the cellular base station by the wireless device as part of the contention based random access procedure, wherein performing the contention based random access procedure comprises:
transmitting a first message with a preamble of the contention based random access procedure to the cellular base station, wherein the first message includes wireless device identification information and beam failure indication; and
receiving a second message resolving the contention based at least in part on the wireless device identification information being included in the first message of the contention based random access procedure.

2. The apparatus of claim 1, wherein the wireless device is further configured to receive beam reconfiguration information, wherein the beam reconfiguration information indicates a new beam for downlink communications from the cellular base station, wherein the beam reconfiguration information is provided via one of radio resource control (RRC) beam set reconfiguration information or a media access control (MAC) control element adjusting an activated beam subset.

3. The apparatus of claim 1, wherein the at least one processor is further configured to cause the wireless device to:
receive an indication of a beam failure recovery specific pool of PRACH preambles and resources, wherein the indication of the beam failure recovery specific pool of PRACH preambles and resources is received via one of wireless device specific radio resource control configuration information or broadcast configuration information; and
receive an indication of one or more pools of PRACH preambles and resources that are available for one or more other contention based random access procedure triggers according to the cellular link with the cellular base station, wherein the beam failure recovery specific pool of PRACH preambles and resources and the one or more pools of PRACH preambles and resources that are available for one or more other contention based random access procedure triggers comprise different PRACH preambles and resources.

4. The apparatus of claim 3,
wherein the indication of the detected beam failure is provided by initiating the contention based random access procedure using physical random access channel (PRACH) resources and a PRACH preamble configured to indicate a detected beam failure, wherein the PRACH resources and the PRACH preamble used to initiate the contention based random access procedure are selected from the beam failure recovery specific pool of PRACH preambles and resources.

5. The apparatus of claim 3,
wherein the beam failure recovery specific pool of PRACH preambles and resources comprises one or more PRACH preamble and resource combinations associated with specific beams, wherein use of a PRACH preamble and resource combination associated with a specific beam to initiate a contention based random access procedure indicates a request to activate the specific beam.

6. The apparatus of claim 1,
wherein the indication of the detected beam failure is provided by including message content configured to indicate a detected beam failure,
wherein the message content configured to indicate a detected beam failure is comprised in the first message of the contention based random access procedure.

7. The apparatus of claim 6, wherein the message content configured to indicate a detected beam failure comprises an indication of one or more of:
a request to perform beam failure recovery;
an indication of one or more preferred beams;
a beam measurement result for an active beam;
carrier identification information for a carrier associated with the detected beam failure; or
bandwidth part (BWP) identification information for a BWP associated with the detected beam failure.

8. The apparatus of claim 1, wherein beam failure is detected based at least in part on measurement of a beam failure detection reference symbol provided by the cellular base station.

9. A wireless device, comprising:
an antenna;
a radio operably coupled to the antenna; and
at least one processor operably coupled to the radio;
wherein the wireless device is configured to:
establish a cellular link with a cellular base station,
detect beam failure; and
perform a contention based random access procedure based at least in part on detecting beam failure, wherein the wireless device provides a request for beam failure recovery during the contention based random access procedure, wherein performing the contention based random access procedure comprises:
transmitting a first message with a preamble of the contention based random access procedure to the cellular base station, wherein the first message includes wireless device identification information and beam failure indication; and
receiving a second message resolving the based at least in part on the wireless device identification information being included in the first message of the contention based random access procedure.

10. The wireless device of claim 9, wherein the wireless device is further configured to receive beam reconfiguration information, wherein the beam reconfiguration information indicates a new beam for downlink communications from the cellular base station.

11. The wireless device of claim 9,
wherein the wireless device is configured to receive beam configuration information;
wherein the beam configuration information further indicates a set of physical random access channel (PRACH) resources and PRACH preambles configured to indicate a detected beam failure,
wherein the indication of the detected beam failure is provided by initiating the contention based random access procedure using one or more of PRACH resources or a PRACH preamble selected from the set of PRACH resources and PRACH preambles configured to indicate a detected beam failure.

12. The wireless device of claim 9, wherein the indication of the detected beam failure is provided using media access control or radio resource control signaling in the first message of the contention based random access procedure.

13. The wireless device of claim 9, wherein the wireless device is configured to receive beam configuration information indicating s a configured set of candidate beams,
wherein the wireless device is further configured to:
determine a preferred beam among the configured set of candidate beams,
wherein an indication of the preferred beam is provided to the cellular base station by the wireless device as part of the contention based random access procedure.

14. The wireless device of claim 9, wherein the at least one processor is further configured to:
receive an indication of a beam failure recovery specific pool of PRACH preambles and resources, wherein the indication of the beam failure recovery specific pool of PRACH preambles and resources is received via one of wireless device specific radio resource control configuration information or broadcast configuration information; and
receive an indication of one or more pools of PRACH preambles and resources that are available for one or more other contention based random access procedure triggers according to the cellular link with the cellular base station;
wherein the beam failure recovery specific pool of PRACH preambles and resources and the one or more pools of PRACH preambles and resources that are available for one or more other contention based random access procedure triggers comprise different PRACH preambles and resources.

15. The wireless device of claim 9, wherein beam failure is detected based at least in part on measurement of a beam failure detection reference symbol provided by the cellular base station.

16. A cellular base station, comprising:
an antenna;
a radio operably coupled to the antenna; and
at least one processor operably coupled to the radio;
wherein the cellular base station is configured to:
establish a cellular link with a wireless device,
receive a request for beam failure recovery from the wireless device during a contention based random access procedure initiated by the wireless device, wherein the contention based random access procedure comprises receiving wireless device identification information from the wireless device in a first message of the contention based random access procedure; and
provide a second message resolving the contention based at least in part on the request for beam failure recovery, and wherein the second message is based at least in part on the wireless device identification information being included in the first message of the contention based random access procedure.

17. The cellular base station of claim 16, wherein the cellular base station is further configured to:

determine a set of physical random access channel (PRACH) resources and PRACH preambles configured to indicate beam failure when used to initiate a contention based random access procedure, provide beam configuration information to the wireless device, wherein the beam configuration information indicates the set of PRACH resources and PRACH preambles configured to indicate beam failure when used to initiate a contention based random access procedure;

wherein the request for beam failure recovery comprises initiation of the contention based random access procedure by the wireless device using PRACH resources and a PRACH preamble selected from the set of PRACH resources and PRACH preambles configured to indicate beam failure when used to initiate a contention based random access procedure.

18. The cellular base station of claim 17, wherein the cellular base station is further configured to:

provide beam configuration information indicating the set of PRACH resources and PRACH preambles configured to indicate beam failure when used to initiate a contention based random access procedure to one or more other wireless devices, wherein the set of PRACH resources and PRACH preambles configured to indicate beam failure when used to initiate a contention based random access procedure are shared among the wireless device and the one or more other wireless devices.

19. The cellular base station of claim 17, wherein the beam configuration information further indicates a configured set of candidate beams, wherein the cellular base station is further configured to:

receive an indication of a preferred beam by the wireless device as part of the contention based random access procedure.

20. The cellular base station of claim 16,
wherein the request for beam failure recovery comprises media access control or radio resource control signaling received by the cellular base station in the first message of the contention based random access procedure.

* * * * *

UNITED STATES PATENT AND TRADEMARK OFFICE
CERTIFICATE OF CORRECTION

PATENT NO. : 11,695,463 B2
APPLICATION NO. : 17/051149
DATED : July 4, 2023
INVENTOR(S) : Fangli Xu et al.

Page 1 of 1

It is certified that error appears in the above-identified patent and that said Letters Patent is hereby corrected as shown below:

In the Claims

Column 20, Line 14, delete "device to:" and substitute --device to: establish a cellular link with a cellular link with a cellular base station,--.

Column 21, Line 54, delete "resolving the" and substitute --resolving the contention--.

Column 22, Line 15, delete "indicating s" and substitute --indicating--.

Signed and Sealed this
Twenty-sixth Day of December, 2023

Katherine Kelly Vidal
*Director of the United States Patent and Trademark Office*